(12) United States Patent
Gehrmann et al.

(10) Patent No.: US 7,181,614 B1
(45) Date of Patent: Feb. 20, 2007

(54) METHOD AND ARRANGEMENT IN A COMMUNICATION NETWORK

(75) Inventors: Christian Gehrmann, Månsgatan (SE); Rolf Blom, Svärdvägen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 819 days.

(21) Appl. No.: 09/692,709

(22) Filed: Oct. 19, 2000

(30) Foreign Application Priority Data

Oct. 27, 1999 (EP) .................... 99850158

(51) Int. Cl.
*H04L 9/00* (2006.01)

(52) U.S. Cl. ....................... 713/155; 709/249
(58) Field of Classification Search ................. 713/155
See application file for complete search history.

(56) References Cited

U.S. PATENT DOCUMENTS 5,539,881 A * 7/1996 Hunt et al. .................. 709/242
6,691,173 B2 * 2/2004 Morris et al. ............... 709/249

FOREIGN PATENT DOCUMENTS

EP 0939519 A1 9/1999

OTHER PUBLICATIONS

Chadwick, David W., Young, Andrew J., "Merging and Extending the PGP and PEM Trust Models—The ICE-TEL Trust Model", May/Jun. 1997, pp. 16-24.*

Carnerero Álvaro, F.; European Search Report, App. No. EP 99850158, Jul. 20, 2000, pp. 1-4.
Tanaka, T. et al.; "Nomadic Computing Environment Employing Wired and Wireless Networks," IEICE Transactions on Communications, JP, Institute of Electronics Information and Comm. Eng. Tokyo, vol. E81-B, No. 8, Aug. 1, 1998, pp. 1565-1573.
Chadwick, D. et al.; "Merging and Extending the PGP and PEM Trust Models—The ICE-TEL Trust Model," IEEE Network: The Magazine of Computer Communications, US, IEEE Inc. New York, vol. 11, No. 3, May 1, 1997, pp. 16-24.
Zhou, L. et al.; Securing Ad Hoc Networks, IEEE Network: The Magazine of Computer Communications, US, IEEE Inc. New York, vol. 13 No. 6, Nov. 1999, pp. 24-30.
Lakshmi Venkatraman and Dharma P. Agrawal, A Novel Authentication scheme for Ad hoc Networks, XP-002174678, Sep. 28, 2000, 1268-1273.
Hans Pettersson, International Search Report, PCT/SE00/02021, Aug. 10, 2001.

* cited by examiner

*Primary Examiner*—Gilberto Barrón, Jr.
*Assistant Examiner*—Brandon Hoffman

(57) ABSTRACT

The present invention relates to establishing security within an ad hoc network. Such ad hoc networks do not have on-line connections to a particular server for getting desired public keys or certificates, thereby requiring them to create trust relations among their respective nodes wherein some of the nodes have a mutual trust relation to each other, thus constituting a trust group. When a particular candidate node desires to join the trust group, an X-node is identified, being a member of a trust group and having a trust relation with the candidate node. The X-node then certifies the candidate node and establishes and distributes trust relations between the members of the trust group and the candidate node.

21 Claims, 5 Drawing Sheets

METHOD AND ARRANGEMENT IN A COMMUNICATION NETWORK

FIELD OF INVENTION

The present invention relates to the field of communication networks and more specifically to an ad hoc communication network and a method for establishing security in an ad hoc network.

DESCRIPTION OF RELATED ART

The fast growth of open networks with easy access has raised many security problems. Several security solutions for public networks like the Internet have appeared. Security is a problem in all kinds of open networks both wired and wireless. Information transmitted over the air is extremely vulnerable. Today there exist solutions that are built upon some type of so called public key infrastructure (PKI). A public key infrastructure is a system used to distribute and check public keys that can be used to authenticate users, exchange session keys, sign information or encrypt information.

In a PKI system, two corresponding (also called asymmetric) keys are used in connection with protecting information. Information, which is encrypted with one of the two keys, can be decrypted only with the other key. In some PKI systems either of the two keys can be used to encrypt and the other to decrypt. In other systems, one key must be used only for encryption and the other for decryption. One important feature of PKI systems is that it is computationally unfeasible to use knowledge of one of the keys to deduce the other key. In a typical PKI system, each of the systems possesses a set of two such keys. One of the keys is maintained private while the other is freely published. If a sender encrypts a message with the recipient's public key, only the intended recipient can decrypt the message, since only the recipient is in possession of the private key corresponding to the published public key. If the sender, before performing the above encryption, first encrypts the message with the senders private key, the recipient, upon performing first a decryption, using the recipient's private key, then a decryption on the result, using the sender's public key, is assured not only of privacy but of authentication since only the sender could have encrypted a message such that the sender's public key successfully decrypts it. In one digital signature scheme, one-way hash is first applied to a message and the hash of the message is encrypted with the sender's private key.

A PKI distributes one or several public keys and determine whether a certain public key can be trusted for certain usage or not. A piece of digitally signed information is often called a certificate. Certificates are the basis upon which PKIs are built.

The degree of confidence that the recipient has in the source of a message depends on the degree of the recipient's confidence that the sender's public key corresponds to a private key that was possessed only by the sender. In many current systems, a number of generally well trusted certification authorities have been established to provide this degree of confidence.

A common certificate format is Standard X.509 (developed by the International Standards Organisation (ISO) and the Comité Consultatif Internationale Telegraphique et Telephonique (CCITT)). Such a certificate may, e.g., include a public key, the name of subject who possesses or is associated with the public key, an expiration date, all of which are digitally signed by a trusted party. The digital signature may be provided e.g., according to the digital signature standard (DSS) (National Institute of Standards and Technology (NIST)). Typically a digital signature involves applying a one-way hash and then encrypting with the private key of, in this case, the certification authority. Such digital signature is provided using the private key of the trusted party which, in turn, is authenticated using the trusted party's certificate signed by yet another trusted party, so that there may be a multi-level hierarchy of trusted parties.

Another certificate format is Pretty Good Privacy (PGP) developed by P. Zimmermann and described in Internet Engineering Task Force (IETF) Open PGP Specification. PGP provides a way to encrypt and decrypt, sign data and exchange keys. Thus it is more than just a PKI. However, the main idea with PGP is that no strict PKI is needed. Instead the PGP users themselves create and extend the PKI they need. This is done by certifying other users public keys, i.e., signing trusted public keys with their own secret key. In this way a "web of trust" is created. A particular key may have several different user IDs. Typically a user ID is an email address. If a revocation signature follows a key, the key is revoked. A user certifies another users key by signing it with one of the keys of his own, which has signing capability. When signing another key, different trust levels can be set, i.e., the amount of confidence the signer has in the signed key and user ID.

Today, so-called ad hoc networks are used more and more frequently. An ad hoc network is established temporary for a special purpose. There is no fixed infrastructure, the nodes are the network. The nodes within the network are often mobile and using radio links. An ad hoc network might constitute dynamic wide area connectivity in situations such as military operations, rescue and recovery operations, and remote construction sites. An ad hoc network might also constitute local area connectivity in situations such as temporary conference sites, home networks and robot networks. An ad hoc network might also constitute personal area networks in situations such as interconnected accessories, ad hoc conference table and games. The nodes might consist of e.g. mobile phones, lap tops, television sets, washing machines In some situations like in military operations or business conferences when the communication between the nodes comprises secrets, it is very important that a sender of a message can trust that the receiver really is the intended receiver.

In the previous examples, bindings between public keys and names or authorisation are described. Several of these certificate solutions exist in different systems. However, it is not yet described how different certificates needed for different kinds of purposes are obtained. In the case of ordinary X.509 type of PKI with hierarchical Certificate Authority (CA) structures, finding the right certificate is done using some central on-line server or by direct transmission of the certificate at connection set up. When using PGP either the desired public key is stored locally on a machine or the device has to make a connection to a central PGP server in order to find the desired pubic key. This works if it is possible for entities that need some type of security relation to have on-line connections to some particular servers. This is not the case for ad hoc networks. Ad hoc networks are created on the fly between entities that happen to be at the same physical location.

Therefore, what is further needed is a mechanism for checking if different nodes in an ad hoc network share a trust relation and for creating trust among a certain set of nodes without any pre-defined relations.

The problem of how to distribute trust using public keys in ad hoc networks is addressed in this invention. Still the existing PKIs provide a basis upon which solution also for ad hoc network can be built.

SUMMARY OF THE INVENTION

The present invention relates to the requirement of security in an ad hoc network. More particularly it relates to the problem within ad hoc networks, not having on-line connections to a particular server for getting desired public keys or certificates, required to create trust relations.

Accordingly, it is an object of the present invention to unravel the above-mentioned problem.

The aforesaid problem are solved by means of a method for finding possible trust relations between nodes within the ad hoc network and share them with other nodes within the ad hoc network.

The following scenario of establishing security in an ad hoc network describes the inventive concept of the present invention.

Within an ad hoc communication network, some of the nodes have a mutual trust relation to each other, thus constituting a trust group. A node within the network is being a candidate node for joining the trust group. An X-node is identified, being a member of a trust group and having a trust relation with the candidate node. The X-node distributes trust relations between the members of the trust group and the candidate node.

An advantage of the present invention is it is possible to achieve the necessary security associations needed for distributing and sharing information among a group of users that happens to be at the same physical location. There are a large amount of applications that fits in to this scenario. Among those can be mentioned people from different companies or organisations that gather in a conference room can share documents with the meeting members.

Another advantage of the present invention is that the number of manually created trust relations between members in an ad hoc communication network is decreased.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF PREFFERED EMBODIMENTS

The ad hoc communication network according to the invention constitutes e.g. a bluetooth network. The ad hoc network comprises nodes constituting e.g., laptops and mobile phones, each node comprising a receiver and a computer, the computer comprising a processor and a memory. The nodes are interconnected via communication links.

Figure 1:
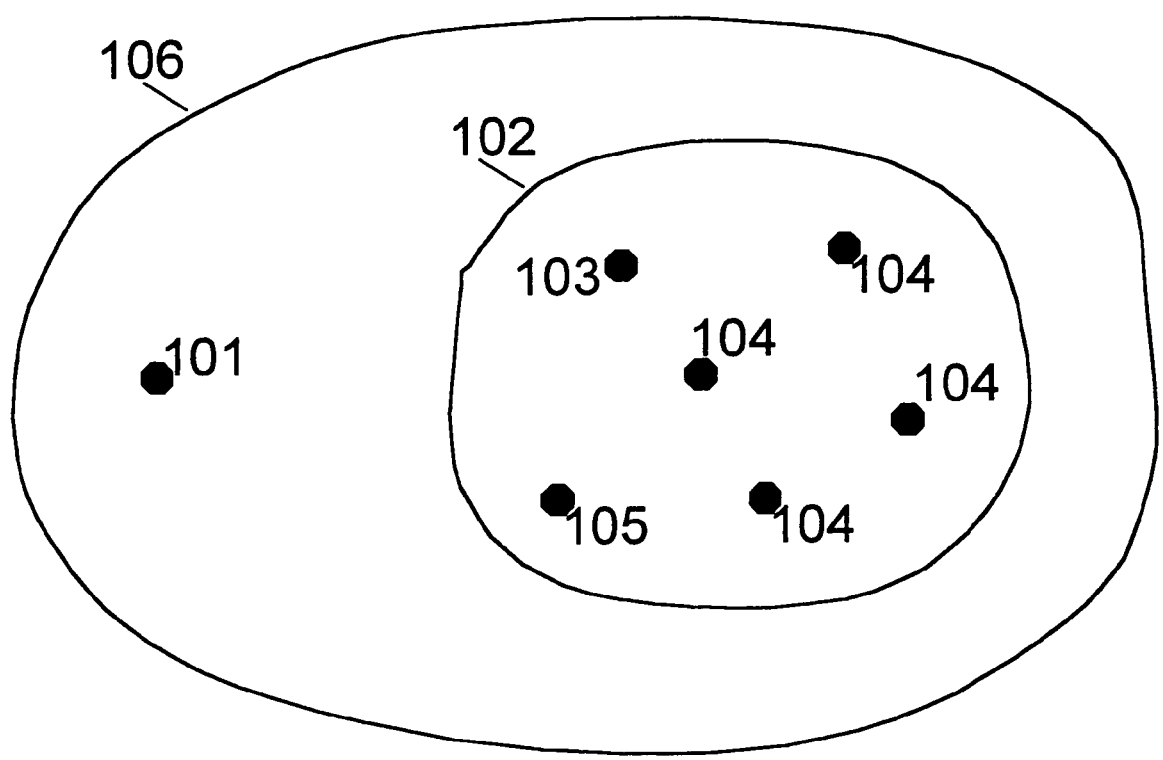
FIG. 1 shows a scenario where a single node establishes trust with an existing trust group within a communication network.

FIG. 1 shows a possible scenario of the present invention in which a single node 101 is added to an existing trust group 102. The trust group 102 comprises nodes 103–105. All the nodes 103–105 in the trust group 102 have mutual trust relations with each other, the trust relations being created with trusted public keys. Thus each node 103–105 in the trust group 102 has the trusted public keys of all the other nodes 103–105 within the trust group 102. The trusted public keys are e.g. used to sign messages to be sent between trusted nodes. The single node 101 and the trust group constitute an ad hoc communication network 106. According to the invention all nodes 101, 103–105 have authority to delegate trust to other nodes that they trust within the network. The single node 101 would like to join the trust group 102 and the single node is from now on called the candidate node 101.

Either the candidate node 101 sends a broadcast message to all the nodes 103–105 within the trust group or it unicasts message to a special look up server where all the nodes 103–105 can obtain the message. The message comprises the public key that the candidate node 101 wants to use. The message might comprise a set of public keys that the candidate node 101 wants to use and possible certificate/s certifying the public key/s.

Each node 103–105 within the trust group 102 obtains the public key of the candidate node 101, and checks if it trusts the public key of the candidate node.

A node 103 within the trust group that trusts the public key of the candidate node 101 is identified, a so-called X-node 103. The X-node, sends a signed message comprising all the trusted keys of the nodes 103–105 within the trust group 102 to the candidate node 101, and signs the public key of the candidate node 101 and sends a message comprising the key together with the signature to all the other nodes 104, 105 within the trust group 102.

If none of the nodes 103–105 within the trust group 102 trusts the candidate node a trust relation has to be manually created with an arbitrary node 105 within the trust group 102. This node 105 thus constitutes an X-node. A manual creation of trust relation between two nodes can be performed in different ways. In one way the two nodes enter their pin codes and then exchange public keys using an authenticated channel. The manual creation of trust relations results in that each node obtains a trusted public key from the other party.

After the manual creation of trust, the X-node 105
sends a signed message comprising all the trusted keys of the nodes 103–105 within the trust group 102 to the candidate node 101, and signs the public key of the candidate node 101 and sends a message comprising the key together with the signature to all the other nodes 103, 104 within the trust group 102.

Figure 2:
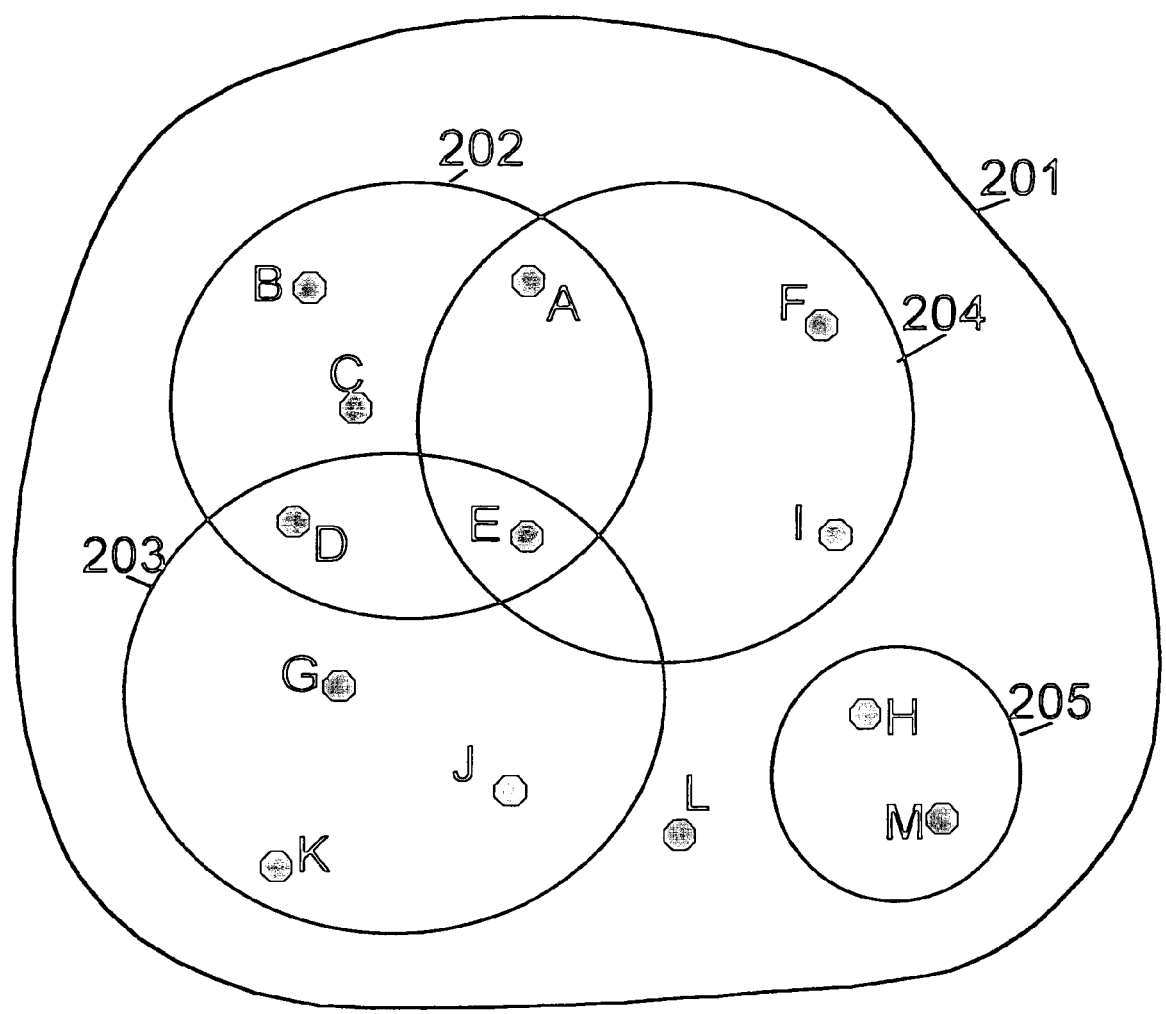
FIG. 2 shows a scenario where trust is established in an ad hoc communication network.

FIG. 2 shows another scenario of the present invention. In this scenario an ad hoc communication network 201 is formed. The trust groups 202, 203, 204 and 205 within the ad hoc network are used to create additional trust relations within the network. The trust relations are created with signed public keys. The ad hoc network comprises nodes A–M. In this embodiment, each of the nodes A–M constitutes a node being a candidate for joining a secure ad hoc network i.e., a trust group wherein all nodes A–M have mutual trust relations.

The nodes A, B, C, D and E have mutual trust relations and constitute a trust group 202.

The nodes D, E, G, J and K have mutual trust relations and constitute a trust group 203.

The nodes A, E, F and I have mutual trust relations and constitute a trust group 204.

The nodes H and M have mutual trust relations and constitute a trust group 205. The node L has no trust relations to any of the other nodes within the network.

As shown in FIG. 2, the node E belongs to three trust groups 202, 203 and 204. The node D and E belong to two trust groups, 202 and 203. The nodes A and E belong to two trust groups 202 and 204.

According to the invention all nodes A–M have authority to delegate trust to other nodes that they trust, within the network. 201.

Each node A–M within the ad hoc network 201 sends a broadcast message to all the nodes A–M within the ad hoc network 201 or a unicast message to a special look up server where all the nodes A–M can obtain the message. The message comprises the public key that the candidate node A–M wants to use. The message might comprise a set of public keys that the candidate node wants to use and possible certificate/s certifying the public key/s.

Each of the nodes A–M obtains the public keys of all the other nodes A–M, either they are trusted or untrusted. Each node A–M then creates a list of its trusted nodes and their corresponding keys. E.g. node A which belongs to trust group is 202 trusts the nodes B, C, D and E.

In this scenario, one node A is decided to act as a server node A. Each of the nodes B–M, sends a registration message to the server node A comprising its public key and the list of its trusted nodes and their corresponding public keys.

Using the obtained information the server node A identifies all the nodes A–M and the trust groups 202–205 within the ad hoc network.

Server node A might find that some nodes or some trust groups are isolated, i.e. neither having a trust relation with the server node A nor having a trust relation with any of the nodes that A has a trust relation with. In this embodiment that goes for node L and trust group 205 comprising the nodes H and M.

Figure 3:
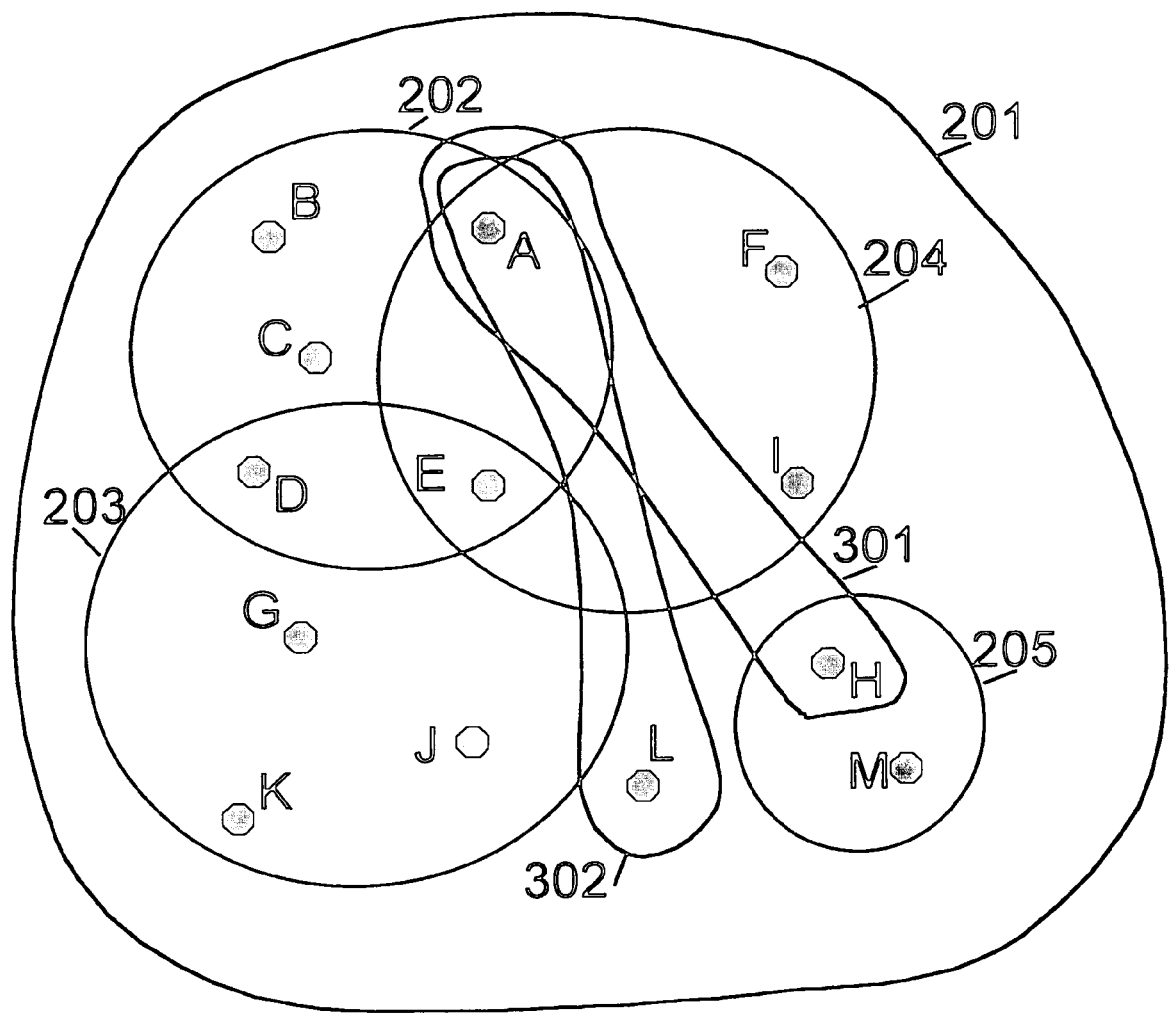
FIG. 3 shows a scenario where trust is established in an ad hoc communication network.

In that case server node A asks the node L, to manually create a trust relation with the server node A. Server node further A asks one node H in that trust group 205, to manually create a trust relation with the server node A. This results in two more trust groups and is illustrated in FIG. 3. The nodes A and L constitutes trust group 301 and the nodes A and H constitutes trust group 302.

The server node A classifies all the nodes within the ad hoc network as being nodes that the server node A trusts, nodes B, C, D, E, F, I, H and L, i.e. sever-trusted nodes, or as being nodes that server node A not trust, nodes G, J, K and M, i.e. server-untrusted nodes. The server node A then makes a list comprising the server-untrusted nodes, the so-called untrust-list.

A server-trusted node trusting a server-untrusted node constitutes a so-called Y-node. The server node A identifies as many Y-nodes as required for distributing trust relations to all or as many as possible of the server-untrusted nodes. I.e. server node A identifies node D, having trust relations with nodes G, K and J, and node H having a trust relation with node M. Thus node D and node H can distribute trust relations between all the server-untrusted nodes and server node A according to the following process:

The server node A sends a message to the identified Y-nodes, the message comprising,
the untrust-list comprising the nodes G, J, K and M and their corresponding public keys, and
a request of distributing as many trust relations as possible between server node A and server-untrusted nodes.

An Y-node obtains the message and checks, which of the keys it trusts, i.e. which of the server-untrusted nodes G, J, K and M the Y-node trusts.

The identified Y-nodes then each perform the following steps 1–3 for each of the nodes that the respective Y-node trusts. In this case the Y-node D performs the steps for each of the nodes G, J and K and Y-node H performs the steps for node M.

1. The Y-node signs the public key of server node A and sends it to the node that the Y-node trusts, e.g. Node D signs server node A's key and sends it to node G,
2. The Y-node signs the public key of the node that the Y-node trusts and sends it to server node A, e.g. Node D signs node G's key and sends it to server node A.
3. Server node A reclassifies the node that the Y-node trust, and that the server node A now trusts, as now being a server-trusted node, and the untrust-list is reduced with said node, e.g. server node A reclassifies node G as being a server trusted node and the untrust-list is reduced to J, K, and M.

The distribution of trust relations is now completed and the untrust-list is empty. Server node A has collected signed public keys from all nodes B–M within the ad hoc network 201 and sends a message to all nodes B–M comprising server node A's collected signed public keys from all the nodes B–M within the ad hoc network.

The nodes A–M within the ad hoc communication network 201 now have mutual trust relations and a secure ad hoc network is established.

Figure 4:
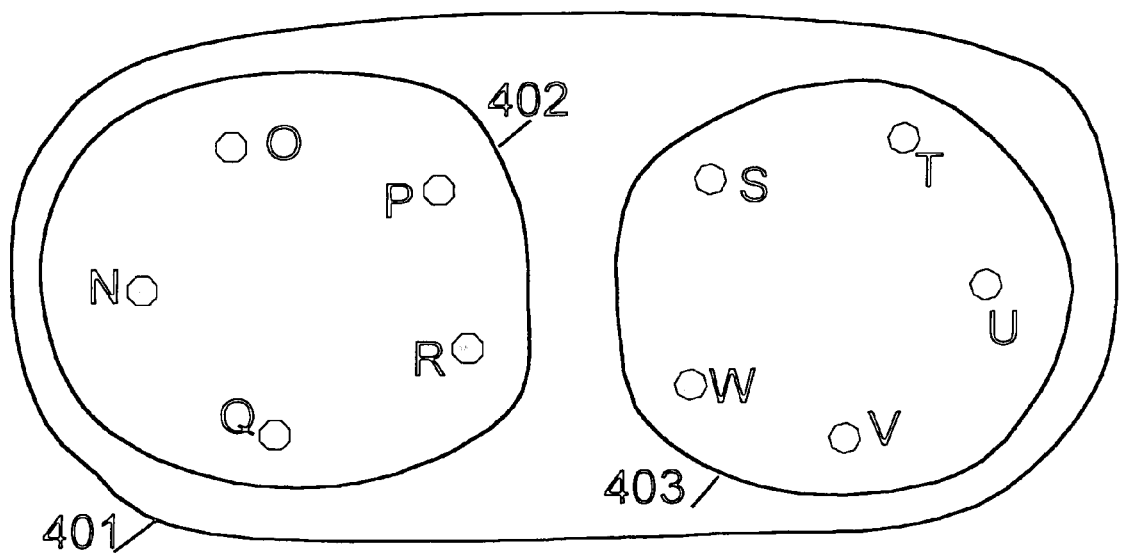
FIG. 4 shows a scenario where two trust groups within an ad hoc communication network are merged.

FIG. 4 shows yet another scenario of the present invention. In this scenario an ad hoc network 401 comprises two trust groups 402 and 403 which shall be merged to one trust group constituting a secure ad hoc network. The first trust group 402 comprises a set of nodes, N, O, P, Q and R, all having mutual trust relations. The second trust group 403 comprises a set of nodes, S, T, U, V and W, all having mutual trust relations and which all are candidate nodes for joining the first trust group 402. The trust relations are created with trusted public keys. A node P is decided to act as a server node P within the first trust group 402 and a candidate node S is decided to act as a server node S within the second trust group. According to the invention, the nodes N–W are authorised to delegate trust relations to other nodes within the network that it trusts.

Server node S sends a message, comprising a list of all candidate nodes S, T, U, V and W within the second trust group 403 and their corresponding public keys, to server node P. First server node P checks if it trusts any of the obtained keys, i.e. if it has trust relations to any of the candidate nodes S, T, U, V and W. First server node P, then classifies the candidate nodes as being first server-trusted nodes or as being first server-untrusted node, in this case P-trusted or P-untrusted.

Figure 5:
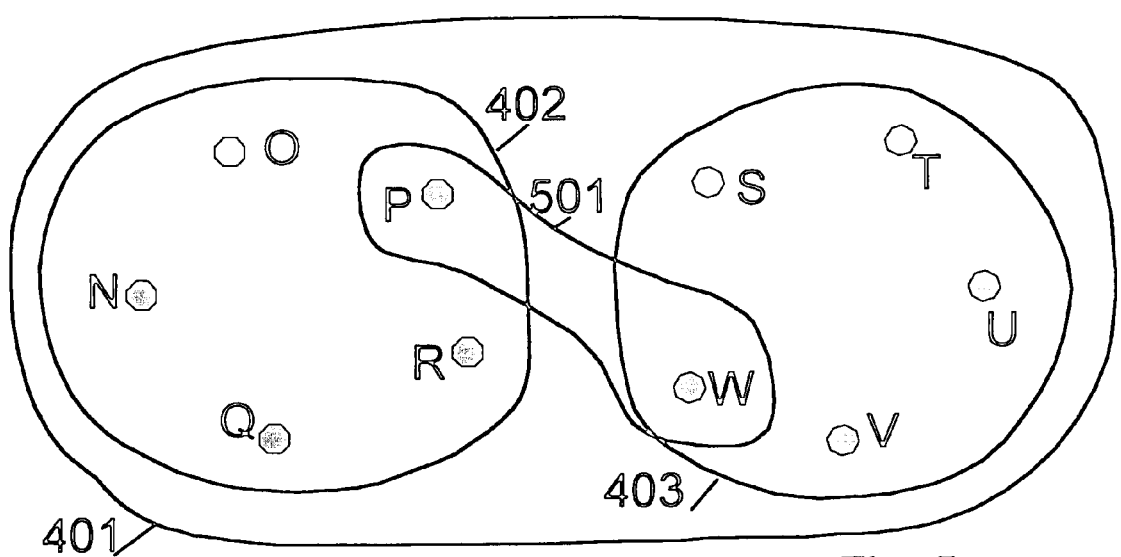
FIG. 5 shows a scenario where two trust groups within an ad hoc communication network are merged.

If the classification results in at least one first server-trusted node, a scenario comes up as illustrated in FIG. 5. In this scenario first server node P has a trust relation to the node W and first server node P sends a message to second server node S. The message comprises

- a list of all nodes N, O, P, Q and R within the first trust group 402 and their corresponding public keys, and
- a list of first server-trusted nodes, which in this case is the P-trusted node W, and its corresponding public key.

Second server node S obtains the message and signs it and forwards it to node W.

Node W receives the signed message and checks the signature of the message. If node W trusts the signature, node W

- signs the received public keys of the nodes N, O, P, Q and R within the first trust group 402,
- sends a signed message comprising the signed public keys of the nodes N, O, P, Q and R within the first trust group 402 to all candidate nodes S, T, U and V within the second network,
- sends a signed message comprising all trusted public keys of the candidate nodes S, T, U, V and W to first server node P.

First server node P receives the message and checks the signature of the message. If it is valid, first server node P signs the public keys of the candidate nodes S, T, U, V and W within the second trust group 403 and sends them in a signed message to all nodes N, O, Q and R.

The nodes N–W within the ad hoc network 102 now have mutual trust relations and a secure ad hoc communication network is established.

Figure 6:
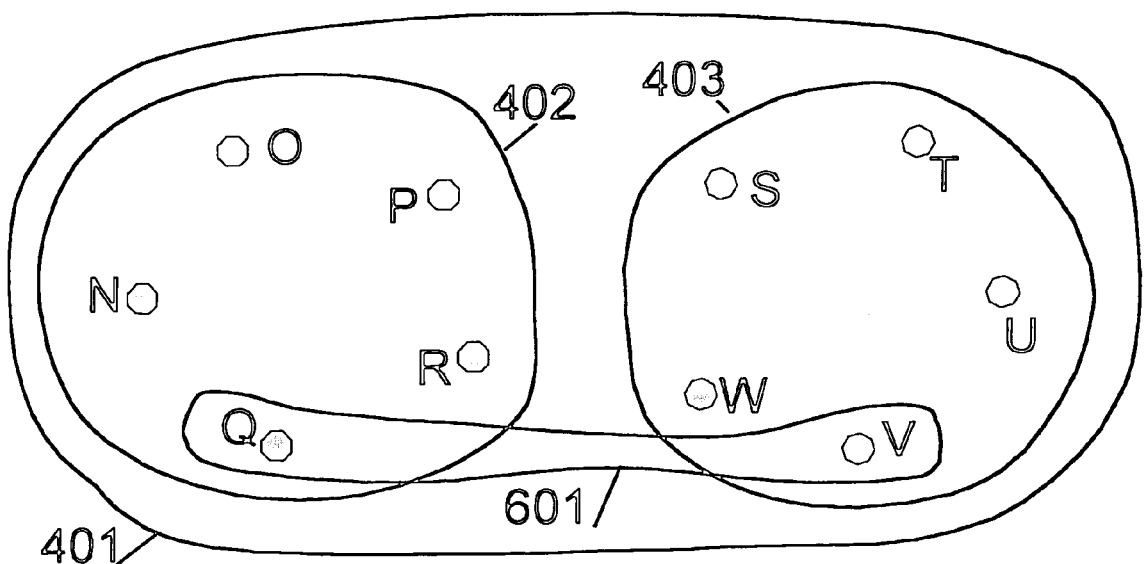
FIG. 6 shows a scenario where two trust groups within an ad hoc communication network are merged.

In another scenario, shown in FIG. 6, the classification is resulting in no first server-trusted node i.e. a P-trusted node. This means that first server node P has no trust relation with any of the candidate nodes S, T, U, V and W. Server node P then asks the other nodes N, O, Q and R within the first trust group 402, one by one, until sever node P obtains a positive answer of the question, if they have a trust relation with any of the candidate nodes S, T, U, V and W, within the second trust group 403.

In this case, node N has no such trust relation, the query is forwarded to node O, which has not got such trust relation either. The query is forwarded to node Q, which has a trust relation with node V in the second trust group, and now the procedure of distributing trust can start.

Node Q sends a signed message to second server node S. The message comprises:

- a list of all nodes N, O, P, Q and R within the first trust group 402 and their corresponding public keys,
- a list of the nodes that node Q trusts, which in this case is the node V, and its corresponding public key.

Second server node S obtains the message and forwards it to node V.

Node V receives the signed message and checks the signature of the message. If node V trusts the signature, it signs the received public keys of the nodes N, O, P, Q and R within the first trust group 402. Node V then sends a signed message comprising the signed public keys of the nodes N, O, P, Q and R within the first trust group 402 to all candidate nodes S, T, U and W within the second network. Node V sends a signed message comprising all trusted public keys of the candidate nodes S, T, U, V and W to node Q.

Node Q receives the message and checks the signature of the message. If it is valid, node Q signs the public keys of the candidate nodes S, T, U, V and W within the second trust group 403 and sends the keys in a signed message to the other nodes N, O, P and R within the first trust group 402.

The nodes N–W within the ad hoc network 102 now have mutual trust relations and a secure ad hoc communication network is established.

Figure 7:
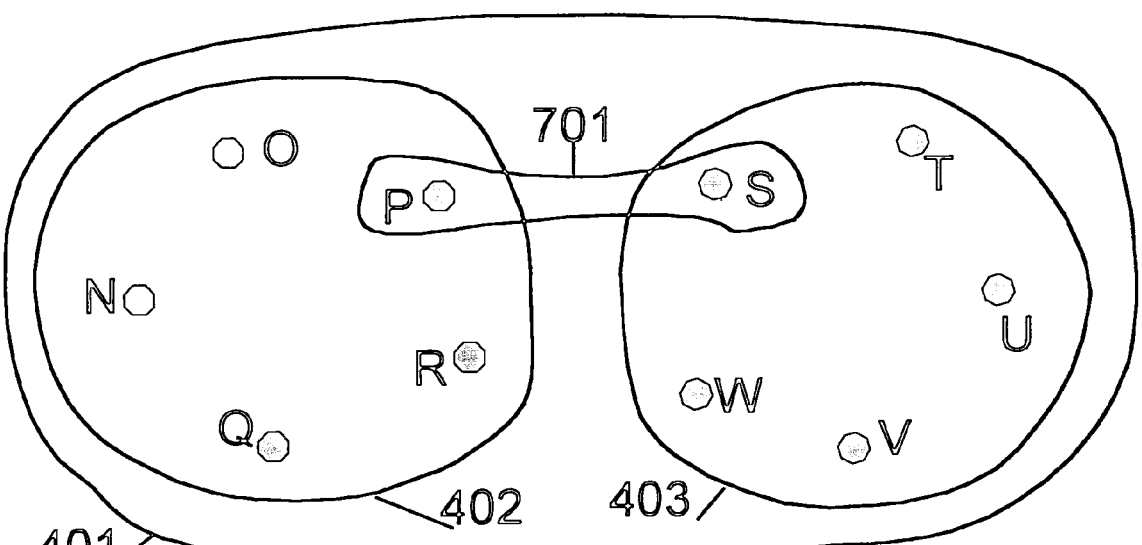
FIG. 7 shows a scenario where two trust groups within an ad hoc communication network are merged.

In yet another scenario, none of the nodes N, O, P, Q and R, within the first trust group 402, have a trust relation with any of the candidate nodes S, T, U, V and W, within the second trust group 403. In this case a message is returned to first server node P asking node P to manually create a trust relation with the second server node S. This scenario is illustrated in FIG. 7. First server node P and second server node S now constitute a trust group 701.

First server node P sends a message to second server node S. The message comprises a list of all nodes N, O, P, Q and R, within the first trust group 402, and their corresponding public keys.

Second server node S

- signs the received public keys of the nodes N, O, P, Q and R within the first trust group 402,
- sends a signed message comprising the signed public keys of the nodes N, O, P, Q and R within the first trust group 402 to all candidate nodes S, T, U and V within the second network,
- sends a signed message comprising all trusted public keys of the candidate nodes S, T, U, V and W to first server node P.

First server node P receives the message and checks the signature of the message. If it is valid, first server node P signs the public keys of the candidate nodes S, T, U, V and W within the second trust group 403 and sends them in a signed message to all nodes N, O, Q and R.

The nodes N–W within the ad hoc communication network 102 are now having mutual trust relations and a secure ad hoc network is established.

The invention claimed is:

1. A method for establishing security in an ad hoc communication network, the ad hoc communication network comprising a set of communication nodes, at least two nodes of the set of communication nodes having a mutual trust relation and comprising a trust group, the trust relations being created with public keys, and at least one additional node, the at least one additional node being a candidate node for joining the trust group within the ad hoc communication network, the nodes having authority to delegate trust to nodes of the set of communication nodes within the trust group, the method comprising the steps of:

receiving a request from the candidate node to join the trust group within said ad hoc communication network wherein said ad hoc communication network does not include a separate certificate authority;

identifying any node within the trust group having a trust relation with the candidate node, the node having the trust relation with the candidate node being an X-node; and distributing trust relations between all members in the trust group and the candidate node by means of the X-node distributing the public key associated with said candidate node to said all members of the trust group and wherein X-node further sending a signed message comprising a list of nodes that the X-node trusts within the ad hoc communication network and all corresponding public keys to the candidate node.

2. The method according to claim 1, wherein the distributing step comprises the X-node signing the candidate node's public key.

3. The method according to claim 2, wherein the distributing step comprises the X-node sending a message comprising the candidate node's signed public key to the nodes within the trust group.

4. The method according to claim 1, wherein the ad hoc communication network comprises a set of nodes comprising several trust groups, each of the set of nodes being candidates for joining all trust groups within the ad hoc communication network that the set of nodes are not already a member of, the method comprising, after receiving the messages, each node of the set of nodes creating a list of candidate nodes that a given node of the set of nodes trusts and corresponding public keys.

5. The method according to claim 4, further comprising deciding one node within the ad hoc communication network to act as a server node.

6. The method according to claim 5, further comprising the server node receiving, from each other node within the ad hoc communication network, a message comprising a respective public key, a respective list of candidate nodes that the respective node trusts, and corresponding public keys.

7. The method according to claim 6, further comprising the server node classifying the at least one candidate node as being a server-trusted node or as being a server-un-trusted node, depending on whether the server node trusts the at least one candidate node or not.

8. The method according to claim 7, wherein the identifying step further comprises the server node identifying at least one Y-node required for distributing trust relations between the server node and at least one server untrusted node.

9. The method according to claim 8, wherein said distributing step further comprises sending, by the server node, of a request to the identified at least one Y-node to distribute said trust relations between the server node and the server-untrusted nodes.

10. The method according to claim 9, wherein said distributing step further comprises obtaining, by the server node, of said requested trust relations.

11. The method according to claim 10, wherein the step of obtaining the trust relations further comprises:
    signing, by the Y-node, of the public key of the server node for each server-untrusted node that the Y-node has a trust relation with; and
    forwarding, by the Y-node, of said signed public key to the server-untrusted node.

12. The method according to claim 10, wherein the step of obtaining the trust relations comprises:
    signing, by the Y-node, of the public key of the server-untrusted node for each server-untrusted node that the Y-node has a trust relation with; and
    forwarding, by the Y-node, of said signed public key to the server node.

13. The method according to claim 10, comprising the further step of, after obtaining said trust relation, reclassifying, by the server node, the server-untrusted node with the obtained trust relation as being a server-trusted node.

14. The method according to claim 10, comprising the further step of sending, by the server node, of a signed message comprising the server node's trusted public keys belonging to trusted candidate nodes within the ad hoc communication network.

15. An ad hoc communication network comprising:
    a set of communication nodes within said ad hoc communication network wherein said communication network does not have a separate certification authority,
    each node of said set of communication nodes comprising a receiver and a computer, the computer comprising a processor and a memory, each node being interconnected with communication links, at least two of the nodes having a mutual trust relation and comprising a trust group, the trust relations being created with public keys,
    at least one additional node of the set of communication nodes being a candidate node for joining at least one trust group within the ad hoc network,
    the at least one candidate node having means for requesting if any of the nodes within the trust group have a trust relation with the candidate node, and
    any one node being authorised to and having means for distributing trust relations between the trust group and the candidate node that the node trusts by distributing the public key associated with said candidate node to said nodes of the trust group and further distributing a list of nodes that the node trusts and all corresponding public keys to the candidate node.

16. The ad hoc communication network according to claim 15, wherein said each node comprises means for creating a list of candidate nodes that each node trusts and corresponding public keys of each node to be stored in the memory.

17. The ad hoc communication network according to claim 15, wherein one node of the set of communication nodes within the ad hoc network is operable as a server node capable of administrate distribution of trust relations.

18. The ad hoc communication network according to claim 17, wherein the server node is operable to classify the at least one candidate node as being a server-trusted node or as being a server-untrusted node, depending on whether the server node trusts the at least one candidate node or not.

19. The ad hoc communication network according to claim 18, wherein the server node comprises means for identifying at least one Y-node required for distributing trust relations between the server node and server-untrusted nodes.

20. The ad hoc communication network according to claim 19, wherein the server node comprises means for sending to each of said at least one Y-node:
    a request as to which of the server-untrusted nodes the Y-node has a trust relation with; and
    a request for distributing trust relations between the server node and the requested server-untrusted nodes.

21. The ad hoc communication network according to claim 18, wherein the server node comprises means for distributing obtained trust relations to the nodes within the ad hoc communication network.

* * * * *